United States Patent Office 3,236,889
Patented Feb. 22, 1966

3,236,889
o-2-PROPYNYLOXY BENZALDEHYDE
O-2-PROPYNYLOXIME
Chester E. Pawloski, Bay City, Mich., assignor to The Dow Chemical Company, Midland, Mich., a corporation of Delaware
No Drawing. Filed Dec. 26, 1963, Ser. No. 333,710
1 Claim. (Cl. 260—566)

The present invention is directed to a compound corresponding to the formula

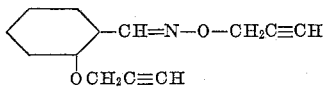

This compound is a liquid which is somewhat soluble in many organic solvents and of low solubility in water. The compound has been found useful as a pesticide for the control of various insects, worms, bacterial, plant and fungal organisms such as roundworms, beetles, roaches, and mites.

The new compound can be prepared by reacting salicylaldoxime with a propargyl halide such as propargyl bromide or propargyl chloride. The reaction is carried out in the presence of a basic material and preferably in a liquid reaction medium such as isopropanol, acetone or methyl ethyl ketone. The reaction takes place at temperatures at which the halide of reaction is produced and preferably at a temperature in the range from 0 to 100° C. The halide of reaction appears in the reaction mixture as a salt of the metal cation from the employed base. Good results are obtained when one molecular proportion of salicylaldoxime and greater than one molecular proportion, preferably an excess, of each of the propargyl halide and basic material are employed. The reaction consumes the reactants in molecular proportions of 2 moles of propargyl halide and 2 moles of basic material such as alkali metal carbonate for every mole of salicylaldoxime and the use of amounts which represent such proportions is preferred when optimum yields are desired. Upon the completion of the reaction, the desired product can be separated and purified by conventional procedures.

In carrying out the reaction the propargyl halide, the salicylaldoxime and the basic material are combined in a convenient fashion. However, it is preferable to disperse the reactants in an organic solvent as reaction medium. The resulting mixture can then be maintained at the contacting temperature for a period of time to insure completion of the reaction. The reaction mixture can be filtered to remove the halide of reaction and the filtrate employed in pesticidal applications. In a preferred procedure, however, the heated reaction mixture is combined with a solution of aqueous alkali metal hydroxide and heated for a short time. The alkali metal hydroxide converts any unreacted starting materials into water soluble salts which can be removed by washing the reaction mixture with water. The organic phase which is obtained during the washing procedure is collected and heated to remove the low boiling constituents.

In a representative operation, salicylaldoxime (25 grams), propargyl bromide (45 grams) and potassium carbonate (52 grams) were disposed in 300 milliliters of acetone. The resulting mixture was heated at the boiling temperature and under reflux for 24 hours. Thirty milliliters of aqueous 33 percent sodium hydroxide was added to the reaction mixture and the mixture heated for another two hours. The organic layer was separated and filtered to remove the halide of reaction. The filtrate was heated to remove the low boiling constituents and obtain the o-2-propynyloxy benzaldehyde O-2-propynyloxime product as red liquid having a refractive index $n/D$ of 1.5683 at 25° C.

The novel product of the present invention is useful as a pesticide for the control of a number of plant and animal species. For such use the product is dispersed on an inert finely divided solid and employed as a dust. Such mixtures can also be dispersed in water with or without the aid of a surface active agent, and the resulting aqueous dispersions employed as sprays. In other procedures, the product is employed as an active constituent in solvent solutions, oil-in-water or water-in-oil emulsions, and aqueous dispersions.

In representative operations, excellent controls and kills of Japanese millet were obtained when o-2-propynyloxy benzaldehyde O-2-propynyloxime is employed in dosages of 50 pounds per acre.

I claim:
o-2-propynyloxy benzaldehyde O-2-propynyloxime.

No references cited.

CHARLES B. PARKER, *Primary Examiner.*